April 16, 1968
W. P. BANKS ET AL
3,378,472
ANODIC PASSIVATION USING STAINLESS STEEL REFERENCE ELECTRODE
Filed Oct. 12, 1964
2 Sheets-Sheet 1
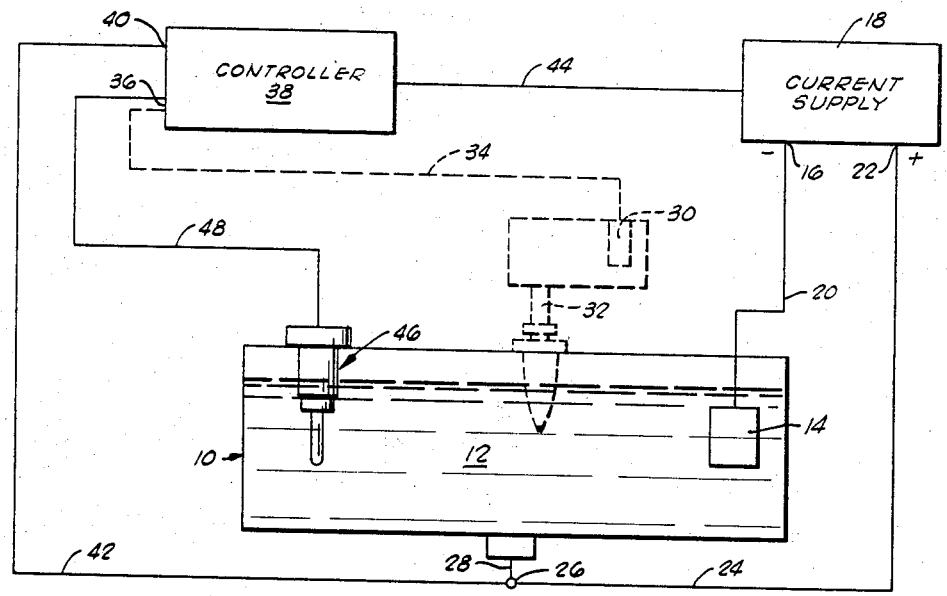
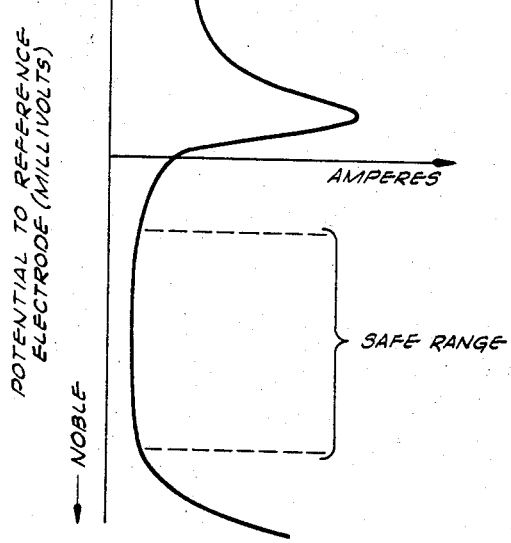
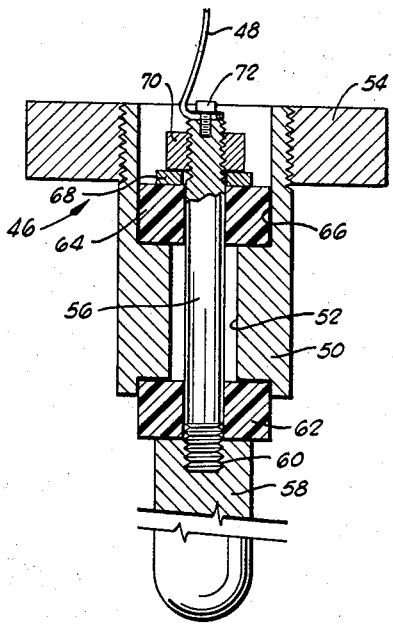
INVENTORS
WILLIAM P. BANKS &
MERLE HUTCHISON
BY William J. Miller
ATTORNEY

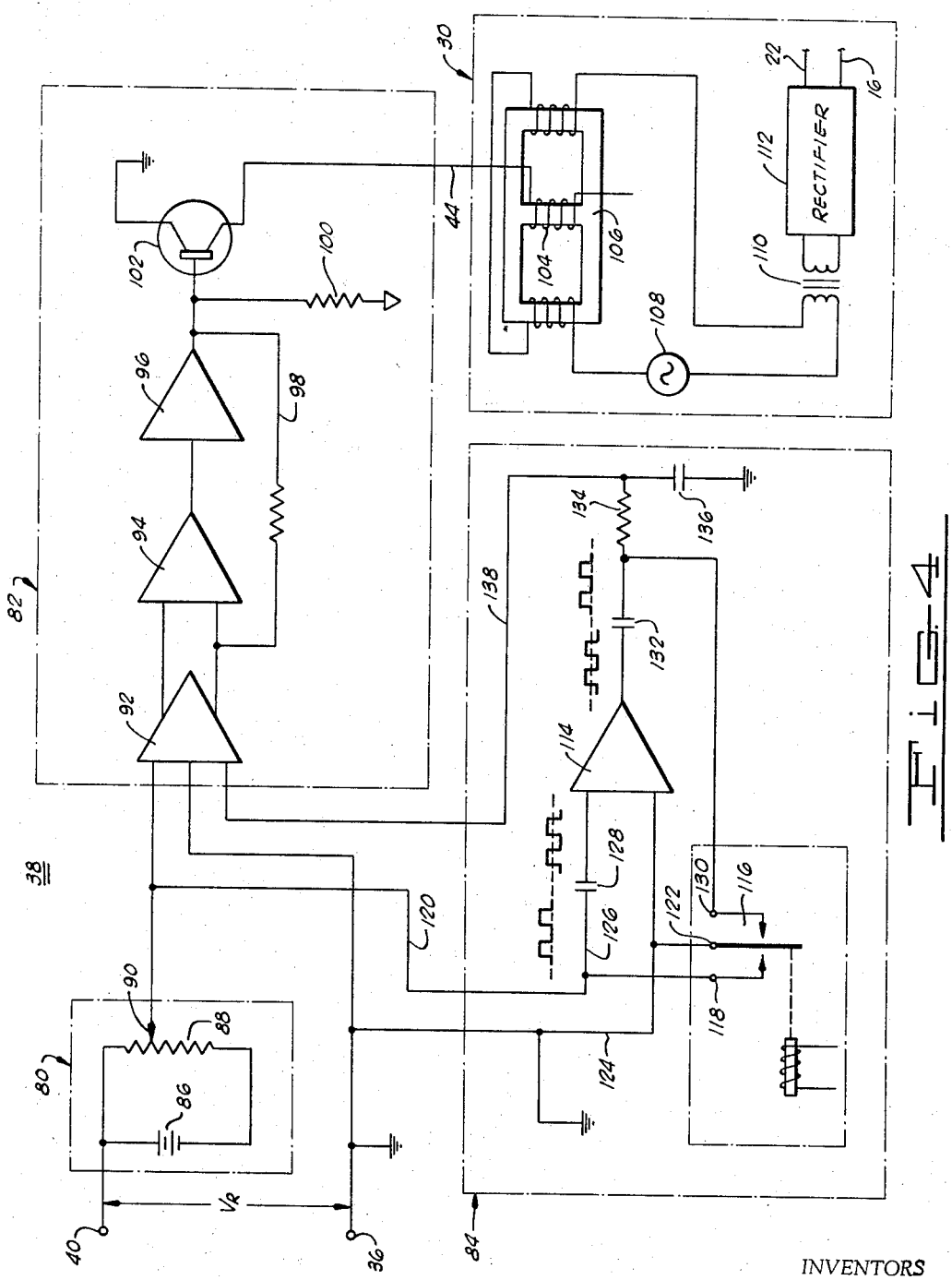

United States Patent Office 3,378,472
Patented Apr. 16, 1968

3,378,472
ANODIC PASSIVATION USING STAINLESS
STEEL REFERENCE ELECTRODE
William P. Banks and Merle Hutchison, Ponca City, Okla.,
assignors to Continental Oil Company, Ponca City,
Okla., a corporation of Delaware
Filed Oct. 12, 1964, Ser. No. 403,138
2 Claims. (Cl. 204—147)

ABSTRACT OF THE DISCLOSURE

A method of anodically protecting a metallic vessel containing ammonium nitrate fertilizer solutions or solutions containing nitrate, ammonium, or hydroxide ions, from corrosion, wherein the reference electrode is made of stainless steel.

---

This invention relates generally to an improved anodic passivation system and method utilizing a reference electrode made of stainless steel. More particularly, but not by way of limitation, the present invention relates to a method and apparatus for protecting storage vessels containing ammonium nitrate fertilizers or nitric acid.

As it is well known in the art of corrosion control, the corrosion of many metals may be prevented or largely reduced by inducing passivity in the metal by anodic polarization techniques. Recently, a method and apparatus for corrosion prevention by means of anodic polarization has been developed wherein a metallic specimen, such as a vessel to be protected against corrosion by a chemical contained therein, is anodically polarized with respect to an inert electrode suspended in the corrosive electrolyte in the vessel. An electrical current is passed between the metallic vessel and the inert cathode in a manner such as to maintain the electrical potential of the vessel in a so-called passive region, that is, a potential range in which the rate of corrosion of the vessel is minimized. The magnitude of the current which is applied between the vessel and the inert cathode is at all times determined by the potential of the metallic vessel, with the current being varied as necessary in order to maintain the potential of the vessel in the region of passivity. The electrical potential values at which the vessel is least susceptible to corrosion when subjected to contact with a particular electrolyte at a particular concentration and temperature may be determined by developing a polarization curve characteristic of the metal when the metal is in contact with the particular electrolyte at such temperature. The polarization curve is, of course, a curve in which the potential difference between the vessel and a reference electrode of constant potential is plotted against current density. The passive region on an anodic polarization curve can be easily identified and provides data indicative of the potential range within which the vessel should be maintained in order to achieve a maximum reduction in corrosion.

In the commercial systems which have been developed for protecting a metallic member by anodic polarization procedures, a reference electrode of constant potential is placed in electrical communication with the corrosive electrolyte contacting the metallic member, and the potential difference between such reference electrode and the metallic member is constantly monitored. This potential difference, which may be termed the reference potential, $V_r$, is constantly compared electrically with a second potential called the control potential, $V_c$. The control potential $V_c$ is the potential difference which, according to polarization curve data, must exist between the metallic member and the reference electrode if the vessel is to be maintained in a passive state. The continuous electrical comparison of the reference potential $V_r$ with the control potential $V_c$ results in the continuous generation of an error voltage $V_e$ which provides a signal usable to increase or decrease the amount of current passed between the metallic member and the inert cathode suspended in the electrolyte. In other words, the reference potential $V_r$ is constantly monitored, and the anodic corrosion control system functions to develop an error signal in the manner described to constantly maintain the metallic member at a passive potential.

Prior to this invention, the reference electrodes which have been used in anodic passivation systems have been expensive; normally difficult to maintain in service and almost invariably sensitive to temperature changes. Although some solid reference electrodes have been used, such as platinum-platinum oxide and silver-silver chloride electrodes, such solid metal electrodes are very expensive. As a result, the most popular reference electrode which has been used is a calomel electrode which requires the use of a salt bridge to provide electrochemical communication between the solution in the vessel being protected and the calomel electrode. The calomel electrode is very stable and has been used extensively, but a calomel electrode is sensitive to temperature changes, and as indicated, must be connected to the corrosive electrolytic solution by a salt bridge in order to retain its stability.

We have found that at least in some storage systems, the reference electrode may be made of stainless steel to provide an extremely economical installation, as compared with prior anodic passivation systems. A stainless steel reference electrode has been particularly effective in storage systems wherein either ammonium nitrate fertilizer or nitric acid is being stored. The stainless steel reference electrode may be immersed directly in the corrosive solution; will be inert to the corrosive solution and may be made of any desired size or configuration. Also, in ammonium nitrate fertilizer solutions and in nitric acid, a stainless steel reference electrode has been found to be sufficiently stable at elevated temperatures for effectively functioning as a reference electrode.

An object of this invention is to increase the economy of installation and operation of anodic passivation systems.

Another object of this invention is to provide a reference electrode for anodic passivation systems protecting metal storage vessels containing ammonium nitrate fertilizers or nitric acid which is inert to the corrosive solution and may be immersed directly in the solution.

Another object of this invention is to provide a reference electrode for an anodic passivation system which is stable, even at elevated temperatures.

A further object of this invention is to provide a reference electrode for an anodic passivation system which is formed of a readily available material and which may be made of any desired size and configuration.

Other objects and advantages of the invention will be evident from the following detailed description when read in conjunction with the accompanying drawings which illustrate the invention.

In the drawings:

FIG. 1 is a schematic diagram of an anodic passivation system constructed in accordance with the present invention and illustrating a popular prior type of reference electrode in dashed lines.

FIG. 2 is a typical polarization curve.

FIG. 3 is an enlarged cross-sectional view of a reference electrode assembly in accordance with this invention.

FIG. 4 is a wiring diagram of a controller and current supply used in the present passivation system.

Referring to the drawings in detail, and particularly

FIG. 1, reference character 10 designates a metal vessel to be protected in accordance with the present invention from the corrosive action of a corrosive electrolytic solution 12 contained in the vessel. In a typical case, the vessel 10 is carbon steel and the solution 12 is an ammonium nitrate fertilizer solution or nitric acid.

An inert electrode 14 is suspended in the solution 12 and is connected to the negative output terminal 16 of a current supply 18 through a conductor 20. The positive terminal 22 of the current supply 18 is connected by a conductor 24, a junction 26 and a conductor 28 to the vessel 10. It will thus be seen that the vessel 10 is polarized anodically with respect to the cathode 14 to produce a flow of current between the vessel and the cathode which anodically passivates the vessel, as will be hereinafter more fully set forth. The cathode 14 may be constructed of any material which is inert to the solution 12 and resists changes in potential as a current is passed therethrough, that is, a material which does not polarize. In most instances, platinum has been found to be a suitable material of construction for the electrode 14.

As previously indicated, most prior anodic passivation systems require the use of a calomel reference electrode 30 as shown in dashed lines in FIG. 1 which of necessity was connected by a salt bridge 32 to the solution 12. The calomel reference electrode 30 was also connected by a conductor 34 to one input 36 of a controller 38. The other input 40 of the controller 38 was, and in the present system is, connected to the vessel 10 by a conductor 42, the junction 26 and the conductor 28. The controller 38 would thus monitor the difference in potential between the reference electrode 30 and the vessel 10 which would indicate the rate of corrosion of the vessel 10 as is indicated by the polarization curve shown in FIG. 2. The controller 38 then functions to control current supply 18 through a conductor 44, as shown in FIG. 1, to in turn control the amount of current passed between the vessel 10 and the cathode 14. The details of construction of the controller 38 and current supply 18 are shown in FIG. 4 and will be described below.

The calomel reference electrode 30 is considered a very stable reference electrode and, in combination with the controller 38, provides a rather precise indication of the potential of the vessel 10. However, in running polarization curves on carbon steel vessels containing ammonium nitrate fertilizer solutions and nitric acid, as shown in FIG. 2, we found that the safe passive range of potentials of the vessel 10 was rather broad and the vessel 10 could be maintained in the passive range without the high precision provided by a calomel reference electrode. For example, in a typical solution of ammonium nitrate fertilizer at 80° F. contained in a carbon steel vessel, the safe passive range of the vessel extends from −300 to +600 mv. with respect to a calomel reference electrode. In a typical storage of seventy percent (70%) nitric acid in a carbon steel vessel at 80° F., the safe passive range of the vessel is from about +800 to +1400 mv.

In accordance with the present invention, we dispense with the calomel reference electrode 30 and salt bridge 32 and in lieu thereof utilize a stainless steel reference electrode assembly 46 directly immersed in the solution 12 and connected by a conductor 48 to the input 36 of the controller 38. The stainless steel reference electrode assembly is shown in detail in FIG. 3 and comprises a metal housing 50 having a bore 52 therethrough and suitably supported on the top of the vessel 10 in any desired manner, such as by a supporting nut 54 threaded around the upper end of the housing. A brass conductor rod 56 extends freely through the bore 52 of the housing 50 and extends below the housing 50 to support a stainless steel electrode 58 in the solution 12. The electrode 58 may be of any desired size and configuration and has a threaded aperture 60 in the upper end thereof threadedly receiving the lower end of the conductor rod 56. An insulator 62 is placed around the rod 56 between the upper end of the electrode 58 and the lower end of the housing 50 to completely insulate the electrode 58 from the housing 50. The insulation 62 may be, for example, a washer made of a fluorocarbon polymer, such as sold under the trade name "Teflon." Another insulating washer 64 is telescoped over the rod 56 and rests in a counterbore 66 formed in the upper end portion of the housing 50. The insulating washer 64 is provided to support a brass washer 68 around the rod 56 and the washer 68 is in turn held in position by a brass nut 70. The conductor 48 is suitably secured to the upper end of the conductor 56, as by a screw 72, to provide electrical communication from the input 36 of the controller 38 to the stainless steel reference electrode 58 immersed in the solution 12. It may also be noted that the washer 62 will not only provide insulation of the electrode 58 from the housing 50 but will also form a seal between these two members to prevent the entrance of the solution 12 into the bore 52 of the housing 50. Thus, the only electrical communication between the conductor 48 and the solution 12 will be via the conductor rod 56 and the electrode 58.

CONTROLLER AND CURRENT SUPPLY

As shown in FIG. 4, the controller 38 is best considered in three sections: a set point control 80, a control amplifier 82 and a reset amplifier 84. The set point controller comprises a battery 86 connected across a potentiometer coil 88 which has an adjustable tap 90. The input terminal 40 of the controller, which is connected to the vessel 10, is connected to the positive side of the battery 86. Thus, the battery 86, depending upon the setting of the movable tap 90 of the potentiometer 88, bucks the voltage ($V_r$) between the vessel 10 and the reference electrode 58. It will therefore be understood that the battery 86 and potentiometer 88 form the function of setting the control potential ($V_c$) previously mentioned. Any variation between the control potential and the reference potential ($V_r$) results in an error voltage or signal being applied to the tap 90 of the potentiometer; that is, between the tap 90 and ground.

The error voltage $V_e$ appearing between the set point controller 80 and ground is impressed on one grid of a differential amplifier 92 of the control amplifier 82 to provide a first stage of voltage amplification. The amplified output of the differential amplifier 92 is impressed on a second differential amplifier 94 to provide a second stage of voltage amplification. Both of the differential amplifiers 92 and 94 are, of course, DC amplifiers and provide voltage amplification. The output of the differential amplifier 94 controls the operation of a cathode follower 96 which provides power amplification of the error signal. It will also be noted that a feedback loop 98 extends from the output of the cathode follower 96 to the input of the differential amplifier 94 to reduce the net gain of the control amplifier 82 to maintain stability of operation.

The output of the cathode follower 96 appearing across the cathode resistor 100 may be designated as the "control signal" which is impressed on the base of a PNP transistor 102. The collector of the transistor 102 is connected to ground and the emitter of the transistor is connected by the conductor 44 to a suitable current control device, such as the control winding 104 of a saturable core reactor 106. Since the transistor 102 will conduct when the base thereof is more negative than the emitter, the amount of current flowing through the control winding 104 of the saturable core reactor 106 used to control the current will increase as the control signal goes in a negative direction and vice versa. For example, a negative error signal will decrease the positive potential of the base of the transistor 102 to increase the amount of current flowing through the control winding of the saturable core reactor, which would thus increase the power supplied to the vessel 10 and inert cathode 14.

The saturable core reactor 106 is connected to an AC power supply 108 and to a transformer 110. The output from the transformer 110 is rectified by a suitable rectifier 112 and the direct current thus developed is passed between the vessel 10 and inert cathode 14 as illustrated in FIG. 1.

The control amplifier 82 has a fast response compared with the response of the saturable core reactor 106. Thus, the gain of the control amplifier 82 must be limited to prevent "hunting" or oscillation of the saturable core reactor. In other words, the effect of rapid variations in the error signal would be immediately applied by the control amplifier 82 on the control winding 104 of the saturable core reactor 106; however, the saturable core reactor 106 will not respond simultaneously with such rapid variations in the error signal, and would constantly change to catch up with the changing error signal which changes would in turn provide new error signals. The reset amplifier 84 is therefore provided to obtain the desired gain only upon sustained variations in the error signal, as well as to overcome the effects of drift in the DC amplifiers included in the control amplifier 82.

The reset amplifier 84 basically comprises an AC amplifier 114 and a chopper 116. The error signal appearing at the output of the set point controller 80 is impressed on the chopper 116 by connecting the contact 90 to the stationary contact 118 of the chopper by a conductor 120, with the terminal 36 being connected to the movable contact 122 of the chopper by a conductor 124. Thus, a pulsating DC is provided in the conductor 126 connecting the conductor 124 with the amplifier 114. A condenser 128 is interposed in the conductor 126 to convert the pulsating DC to a substantially square wave AC which is in turn amplified by the amplifier 114 at a gain of, for example, 130. The square wave output of the amplifier 114 is coupled to another stationary contact 130 in the chopper 116 through a condenser 132 to convert the square wave to a pulsating DC signal which is 180° out of phase with the signal fed to the amplifier 114.

The resulting pulsating DC signal is subjected to a low pass filter comprising a resistor 134 and a condenser 136 to provide an amplified error signal in the conductor 138 having a polarity opposite to the polarity of the original error signal appearing at the output of the set point control 80. The modified error signal in conductor 138 is applied to another grid (not shown) of the differential amplifier 92 of the control amplifier 82. It will thus be seen that the output of the differential amplifier 92 comprises an amplification of the difference between the original error signal, and the modified error signal produced by the reset amplifier 84 and passed into the differential amplifier 92 via the conductor 138.

The low pass filter (resistor 134 and capacitor 136) which is used in producing the modified error signal has a relatively long time constant, such as a 0.02 cycle per second, to minimize the rate of variation of the modified error signal compared with the variations in the original error signal. In other words, the original error signal must persist at a given amplitude for an appreciable period of time before there is a change in the modified error signal produced by the reset amplifier 84. Since the modified error signal is subjected to substantially more amplification than the original error signal, the modified error signal will have a major control on the amplitude of the control signal applied to the base of the transistor 102 during sustained variations in the error signal. Variations in the original error signal of short time duration will have a minor effect on the amount of current flowing through the control winding 104 of the saturable core reactor 106 and will not cause the reactor to "hunt."

In passivating the vessel 10 in accordance with the present invention, the set point controller 80 is first adjusted to impose a bucking voltage or control potential $V_c$ equal to the center of the passive range of potential difference between the vessel 10 and the reference electrode 58 as determined from the polarization curve for the particular solution and vessel. It will thus be seen that any time the voltage $V_r$ between the vessel 10 and the reference electrode 58 varies from the set point or control potential $V_c$ of the set point controller 80, an error voltage will be produced between the tap 90 of the set point controller potentiometer 88 and ground. Such error voltage will be amplified by the control amplifier 82, as controlled by the reset amplifier 84, to provide a control signal on the control winding 104 of the saturable core reactor 106. The saturable core reactor will therefore in turn control the output of the rectifier 112 and bring the potential difference between the vessel 10 and the reference electrode 58 back to the control potential $V_c$. Thus, the vessel 10 will be retained in the passive range and the corrosion of the vessel will be at a minimum.

In order to show the utility of stainless steel as a reference electrode in solutions of ammonium nitrate fertilizer and in nitric acid solutions, various laboratory and field data have been obtained. First, a sheet of 316 stainless steel was used as an electrode by immersing it directly in a test solution of ammonium nitrate fertilizer maintained at 25° C. The ammonium nitrate solution used had approximately 62.5 percent $NH_4NO_3$, 23.7 percent $NH_3$ and 13.8 percent $H_2O$. The EMF relationship between the stainless steel electrode and a saturated calomel electrode, maintained at 25° C., was then determined. The data set forth in Table I was obtained. In this data, it will be noted that the variation in EMF between the stainless steel electrode and the saturated calomel electrode is substantially less than the safe passive range of a carbon steel vessel containing the same ammonium nitrate solution. Thus, the data shows that the stainless steel electrode is sufficiently stable in this environment to function as a reference electrode.

TABLE I

| Time: | EMF, mv.[1] |
|---|---|
| 0 | −300 |
| 10 min. | −220 |
| 20 min. | −200 |
| 40 min. | −200 |
| 16 hrs. | −145 |
| 29 hrs. | −137 |
| 40 hrs. | −115 |
| 46 hrs. | −115 |
| 48 hrs. | −105 |
| 64 hrs. | −93 |
| 66 hrs | −82 |

[1] Active to saturated calomel at 25° C. (Sign of potential conforms to IUPAC conventions adopted in 1953.)

At the close of the preceding test, the fertilizer solution was then heated. The data listed below in Table II show the effect of temperature change on the EMF of the 316 stainless steel electrode. Boiling of the solution occurred at 45° C. and the results show that the stainless steel electrode EMF was reasonably independent of temperature until such boiling occurred.

TABLE II

| Time | Temp., °C. | EMF, mv.[1] |
|---|---|---|
| 0 | 25 | −82 |
|  | 30 | −84 |
|  | 35 | −83 |
|  | 40 | −84 |
|  | 45 | −130 |
|  | 45 | −110 |
|  | 45 | [2] −160 |
| 20 min | 42 | −110 |
| 1 hr | 35 | −105 |
| 23 hrs | 32 | −100 |
|  | 25 | −90 |

[1] Active to saturated calomel at 25° C. (Sign of potential conforms to IUPAC conventions adopted in 1953.)
[2] Pronounced solution boiling.

An extended test was then made using a 316 stainless steel reference electrode immersed in the ammonium nitrate fertilizer solution at 80° F. These data are set forth in Table III below wherein it will be noted that after initial aging for approximately six hours, the stainless steel electrode showed an EMF of −135 mv. (active) to saturated calomel. After 28 days, the electrode EMF had shifted only to −24 mv. where the EMF remained essentially constant. It may be further noted that this EMF change of 111 mv. is less than has been observed with other reference electrodes, such as platinum-platinum oxide electrodes.

TABLE III

| Potential, mv.[1] | | Time |
|---|---|---|
| −310 | | 0 |
| −245 | min | 20 |
| −150 | hrs | 3 |
| −135 | hrs | 6⅓ |
| −135 | hrs | 24 |
| −130 | hrs | 48 |
| −121 | hrs | 72 |
| −96 | days | 6 |
| −90 | do | 8 |
| −77 | do | 10 |
| −69 | do | 14 |
| −47 | do | 20 |
| −35 | do | 24 |
| −24 | do | 28 |
| −27 | do | 30 |
| −25 | do | 31 |

[1] Active to saturated calomel (80° F.).

In addition to the determination set forth in Tables I, II and III above in connection with an ammonium nitrate fertilizer solution, we also determined the EMF relationship between a 304 stainless steel sheet, used as a reference electrode, and a saturated calomel electrode in nitric acid solutions. The data tabulated below in Table IV show the effect of time on the EMF of the 304 stainless steel reference electrode at 25° C. in a 70 percent (70%) reagent grade nitric acid solution. It will be noted that the data show stainless steel electrodes to be effective and sufficiently stable for use in nitric acid solutions.

TABLE IV.—70 PERCENT NITRIC ACID

| TIME: | EMF, mv.[1] |
|---|---|
| 0 | +760 |
| 6 min. | +840 |
| 16 min. | +860 |
| 24 min. | +870 |
| 50 min. | +880 |
| 2 hr. | +880 |
| 3 hr. | +880 |
| 19 hr. | +880 |

[1] Noble to saturated calomel at 25° C. (Sign of potential conforms to IUPAC conventions adopted in 1953.)

An anodic passivation system as disclosed herein using a 316 stainless steel reference electrode has been installed on a carbon steel process vessel containing approximately 83 percent ammonium nitrate solution at 165° F. The potential of this 316 stainless steel reference electrode was measured against a saturated calomel electrode (80° F.) at intervals of approximately 30, 45 and 60 days. At each measurement, the EMF of the 316 stainless steel reference electrode was approximately −15 mv. (active) with respect to the saturated calomel.

In addition to the foregoing, an anodic passivation system as of the type disclosed herein has been used for approximately ten months to control the corrosion of a 1.75 million gallon carbon steel vessel storing an ammonium nitrate fertilizer solution at ambient temperature. The fertilizer solution consisted of approximately 62.5 percent $NH_2NO_3$, 23.7 percent $NH_3$ and 13.8 percent $H_2O$. This particular anodic protection system uses a 304 stainless steel reference electrode which has provided highly effective trouble-free service.

From the foregoing, it will be apparent that the present invention provides a novel method and apparatus for passivating storage vessels utilizing a stainless steel reference electrode. The method and apparatus is particularly suited for protecting a storage vessel containing an ammonium nitrate fertilizer solution or nitric acid. The novel reference electrode of this invention is economical to manufacture; is inert to the corrosive solution in which it is immersed; has a stable EMF, and is not appreciably affected by temperature changes in the solution in which it is immersed.

Changes may be made in the combination and arrangement of parts and elements or in the combination and arrangement of steps and procedures as heretofore set forth in the specification and shown in the drawings without departing from the spirit and scope of the invention as defined in the following claims.

What is claimed is:
1. A method of minimizing corrosion of a metal vessel containing an ammonium nitrate fertilizer solution, comprising the steps of:
immersing a stainless steel reference electrode in the solution;
monitoring the difference in potential between the stainless steel reference electrode and the vessel; and
passing current between the vessel and an inert cathode in the solution in accordance with said difference in potential to minimize corrosion of the vessel.
2. A method of minimizing corrosion of a metal vessel containing a corrosive nitric acid solution comprising the steps of:
immersing a stainless steel reference electrode in the solution;
monitoring the difference in potential between the stainless steel reference electrode and the vessel; and
passing current between the vessel and an inert cathode in the solution in accordance with said difference in potential to minimize corrosion of the vessel.

References Cited
UNITED STATES PATENTS

| 3,197,755 | 7/1965 | Conger | 204—196 |
| 3,216,916 | 11/1965 | Locke | 204—196 |

OTHER REFERENCES

Sudbury et al., "Corrosion," vol. 16, No. 2, February 1960, pp. 47t–54t.

HOWARD S. WILLIAMS, *Primary Examiner.*

JOHN H. MACK, *Examiner.*

T. TUNG, *Assistant Examiner.*